US009253800B2

(12) United States Patent
Lee et al.

(10) Patent No.: US 9,253,800 B2
(45) Date of Patent: Feb. 2, 2016

(54) APPARATUSES, SYSTEMS, AND METHODS FOR ACCESS CONFIGURATIONS

(71) Applicant: VIA Telecom Co., Ltd., Grand Cayman, British West Indies (KY)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 14/025,364

(22) Filed: Sep. 12, 2013

(65) Prior Publication Data

US 2014/0078984 A1  Mar. 20, 2014

Related U.S. Application Data

(60) Provisional application No. 61/702,068, filed on Sep. 17, 2012, provisional application No. 61/713,366, filed on Oct. 12, 2012.

(51) Int. Cl.
H04W 4/00       (2009.01)
H04W 74/08      (2009.01)
H04W 48/16      (2009.01)

(52) U.S. Cl.
CPC .......... *H04W 74/0833* (2013.01); *H04W 48/16* (2013.01)

(58) Field of Classification Search
CPC .......................... H04W 74/0833; H04W 48/16
See application file for complete search history.

(56) References Cited

U.S. PATENT DOCUMENTS

| 2005/0239440 A1* | 10/2005 | Chen et al. ............... 455/411 |
| 2012/0127874 A1* | 5/2012 | Oh et al. .................. 370/252 |
| 2013/0156049 A1* | 6/2013 | Calvarese et al. ........ 370/474 |
| 2013/0250867 A1* | 9/2013 | Patwardhan et al. ..... 370/329 |
| 2014/0078984 A1* | 3/2014 | Lee et al. ................. 370/329 |
| 2015/0023166 A1* | 1/2015 | Kim et al. ................ 370/230 |

OTHER PUBLICATIONS

"Upper Layer (Layer 3) Signaling Standard for cdma2000 Spread Spectrum Systems"; 3GPP2 C.S0005-F v2.0; 3rd Generation Partnership Project 2 "3GPP2"; May 2014. pp. 1-2406.
"Medium Access Control (MAC) Standard for cdma2000 Spread Spectrum Systems"; 3GPP2 C.S0003-F v1.0; 3rd Generation Partnership Project 2 "3GPP2"; Dec. 2012. pp. 1-333.

* cited by examiner

*Primary Examiner* — Robert Wilson

(57) ABSTRACT

A mobile communication device including a wireless module and a controller module is provided, and the mobile communication device is coupled to a cellular access station. The wireless module performs wireless transmissions and receptions to and from the cellular access station. The controller module determines whether a GAPM has been received from the cellular access station via the wireless module and whether the mobile communication device supports an EACH, and if so, performs Tx operations on the EACH using a random access procedure with a message duration, and otherwise, if not, performs the Tx operations on an ACH using the random access procedure. Particularly, the GAPM includes a maximum message duration and a minimum message duration over the EACH, and the message duration is not greater than the maximum message duration and not less than the minimum message duration over the EACH.

14 Claims, 5 Drawing Sheets

APPARATUSES, SYSTEMS, AND METHODS FOR ACCESS CONFIGURATIONS

CROSS REFERENCE TO RELATED APPLICATIONS

This application claims the benefit of U.S. Provisional Application No. 61/702,068, filed on Sep. 17, 2012, the entirety of which is incorporated by reference herein. This application claims the benefit of U.S. Provisional Applications No. 61/713,366, filed on Oct. 12, 2012, the entirety of which is incorporated by reference herein.

BACKGROUND OF THE INVENTION

1. Field of the Invention

The invention generally relates to control signaling over access channels in mobile communication environments, and more particularly, to access configurations of a mobile communication device towards a cellular access station over an Enhanced Access Channel (EACH).

2. Description of the Related Art

With growing demand for ubiquitous computing and networking, various wireless technologies have been developed, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, 1x High Rate Packet Data (1xHRPD) technology, Time Division-Synchronous Code Division Multiple Access (TD-SCDMA) technology, Worldwide Interoperability for Microwave Access (WiMAX) technology, Long Term Evolution (LTE) technology, and Time-Division LTE (TD-LTE) technology, etc.

Take the CDMA2000 1x Evolution-Data Optimized (EV-DO) Revision F (or called 1x EV-DO Rev F) technology as an example. When a Mobile Station (MS) (or called User Equipment (UE)) attempts to access a base station, it has to transmit an access request on the Access Channel (ACH) (or called Reverse ACH (R-ACH)) or on the EACH (or called Reverse EACH (R-EACH)). The EACH is similar to the ACH in that the MS's Transmission (Tx) operations on the EACH are randomized to avoid collisions with other MSs' Tx operations on the same channel. The EACH has been further improved, having lower probability of collisions, as the message durations of the MS's Tx operations on the EACH are typically shorter than the message durations of the MS's Tx operations on the ACH. The EACH can be used in different access modes, including a basic access mode and a reservation access mode. For transmission of the access request on the EACH, the MS must determine which access mode and what data rate to use. However, according to the 3GPP2 C.S0003 and C.S0005 Rev F specifications, the base station does not provide sufficient EACH related parameters to the MS for assisting with access mode selection and data rate determination. As a result, the MS's Tx operations on the EACH would be impaired.

BRIEF SUMMARY OF THE INVENTION

In order to solve the aforementioned problem, the invention proposes to include a maximum message duration and a minimum message duration over the EACH in a Generic Access Parameters Message (GAPM), so that the MS may correctly select an access mode and determine the data rate to use according to the received GAPM.

In one aspect of the invention, a mobile communication device coupled to a cellular access station is provided. The mobile communication device comprises a wireless module and a controller module. The wireless module performs wireless transmissions and receptions to and from the cellular access station. The controller module determines whether a GAPM has been received from the cellular access station via the wireless module and whether the mobile communication device supports an EACH, and performs Tx operations on an ACH using a random access procedure when the GAPM has not been received or the mobile communication device does not support the EACH, and performs the Tx operations on the EACH using the random access procedure with a message duration when the GAPM has been received and the mobile communication device supports the EACH, wherein the GAPM comprises a maximum message duration over the EACH and a minimum message duration over the EACH, and the message duration is not greater than the maximum message duration over the EACH and not less than the minimum message duration over the EACH.

In another aspect of the invention, a method for access configurations by a mobile communication device in communications with a cellular access station is provided. The method comprises the steps of: determining whether a GAPM has been received from the cellular access station and whether the mobile communication device supports an EACH, wherein the GAPM comprises a maximum message duration over the EACH and a minimum message duration over the EACH; performing Tx operations on an ACH using a random access procedure when the GAPM has not been received or the mobile communication device does not support the EACH, and performing the Tx operations on the EACH using the random access procedure with a message duration when the GAPM has been received and the mobile communication device supports the EACH, wherein the message duration is not greater than the maximum message duration over the EACH and not less than the minimum message duration over the EACH.

In yet another aspect of the invention, a cellular access station coupled to a mobile communication device is provided. The cellular access station comprises a wireless module and a controller module. The wireless module performs wireless transmissions and receptions to and from the mobile communication device supporting an EACH. The controller module broadcasts, via the wireless module, a GAPM comprising a maximum message duration over the EACH and a minimum message duration over the EACH, so as to configure the mobile communication device to perform Tx operations on the EACH using a random access procedure with a message duration which is not greater than the maximum message duration over the EACH and not less than the minimum message duration over the EACH.

In still another aspect of the invention, a method for access configurations between a mobile communication device and a cellular access station is provided. The method comprises the steps of: providing the mobile communication device which supports an EACH and is in communications with the cellular access station; and broadcasting, by the cellular access station, a GAPM comprising a maximum message duration over the EACH and a minimum message duration over the EACH, so as to configure the mobile communication device to perform Tx operations on the EACH using a random access procedure with a message duration which is not greater than the maximum message duration over the EACH and not less than the minimum message duration over the EACH.

Other aspects and features of the invention will become apparent to those with ordinary skill in the art upon review of the following descriptions of specific embodiments of the mobile communication device, the cellular access station, and the method for access configurations.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. The 3GPP2 specifications described herein are used to teach the spirit of the invention, and the invention is not limited thereto.

Figure 1:
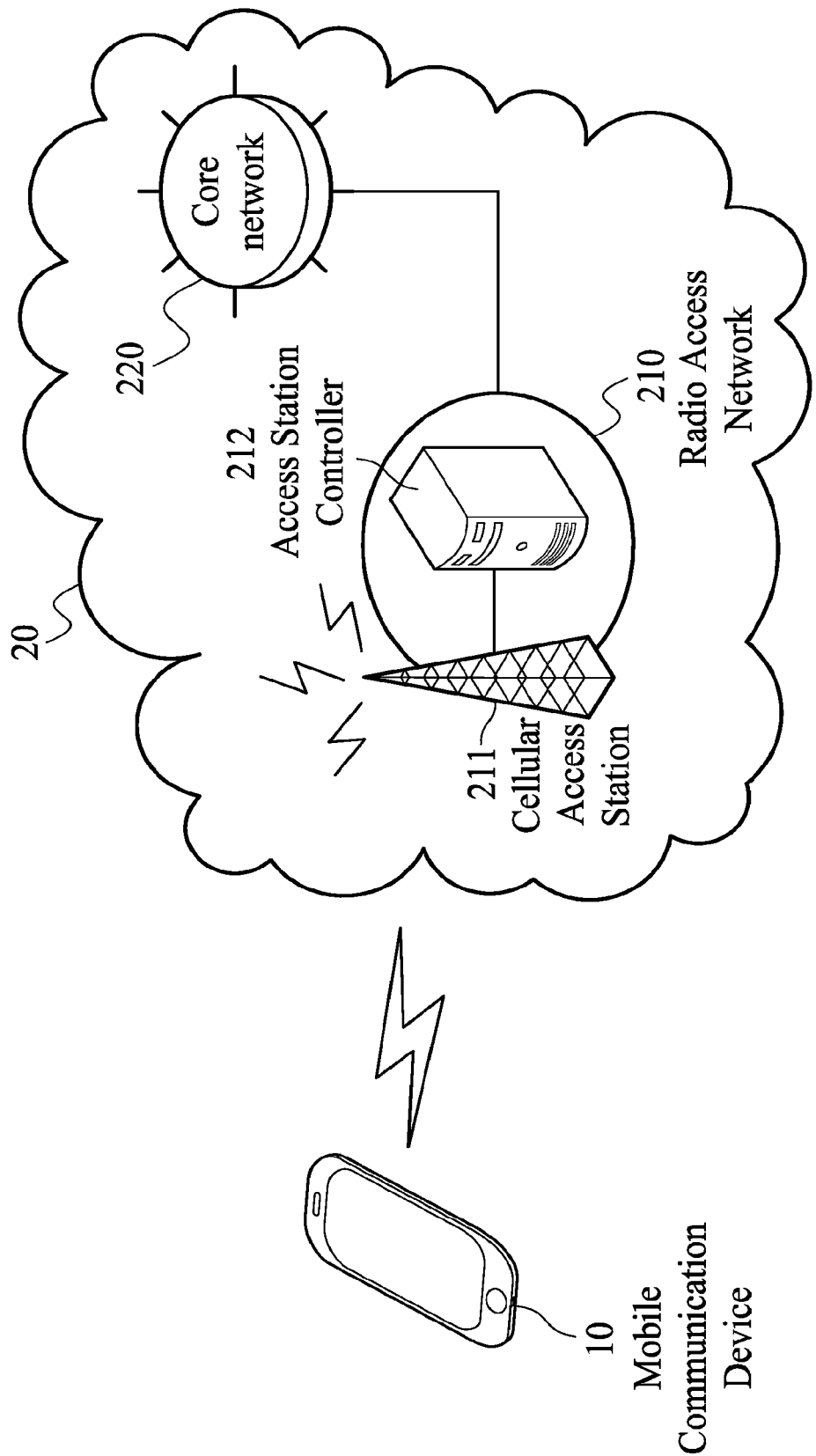
FIG. 1 is a block diagram illustrating a mobile communication environment according to an embodiment of the invention.

FIG. 1 is a block diagram illustrating a mobile communication environment according to an embodiment of the invention. In the mobile communication environment, the mobile communication device 10 wirelessly communicates with the service network 20 via an air interface. The mobile communication device 10 may be a smart phone, a panel computer, a Personal Computer (PC), a laptop computer, or any computing device supporting at least the wireless technology utilized by the service network 20. In one embodiment, the mobile communication device 10 may be configured as a Machine-to-Machine (M2M) device for M2M communications. In another embodiment, the mobile communication device may be a normal device, i.e., a non-M2M device, for non-M2M communications, such as voice and/or data services. The service network 20 comprises a radio access network 210 and a core network 220, wherein the radio access network 210 is responsible for processing radio signals, terminating radio protocols, and connecting the mobile communication device 10 with the core network 220. The radio access network 210 comprises at least a cellular access station 211 and an access station controller 212. The cellular access station 211 is controlled by the access station controller 212 and is responsible for providing wireless transceiving functionality for the service network 20. Specifically, the cellular access station 211 generally serves one cell or multiple logical sectors. The access station controller 212 is responsible for controlling the operation of the cellular access station 211, i.e., managing radio resources, radio parameters, and interfaces for the cellular access station 211. The core network 220 is responsible for performing mobility management, network-side authentication, and interfaces with public networks.

In one embodiment, the service network 20 may be a CDMA2000 system, including 1x Radio Transmission Technology (RTT), 1x EV-DO Release 0/A/B/C, and 1x EV-DO Rev D/E/F. The cellular access station 211 may be a Base Transceiver Station (BTS), and the access station controller 212 may be a Base Station Controller (BSC). The core network 220 may comprise a Circuit-Switched (CS) domain and a Packet-Switched (PS) domain, wherein the CS domain may comprise several network entities, such as a Mobile Switching Center emulation (MSCe), Media Gateway (MGW), Media Resource Function Processor (MRFP), Signaling Gateway (SGW), Service Control Point emulation (SCPe), and Home Location Register emulation (HLRe), and the PS domain may comprise a Packet Data Service Node (PDSN) and Authentication Authorization Accounting (AAA) servers. It is to be understood that, the 1x CDMA2000 system is merely an illustrative example, and other wireless communication networks utilizing any future technology of the 1x CDMA2000 technology family may be used instead, and the invention is not limited thereto.

Figure 2:
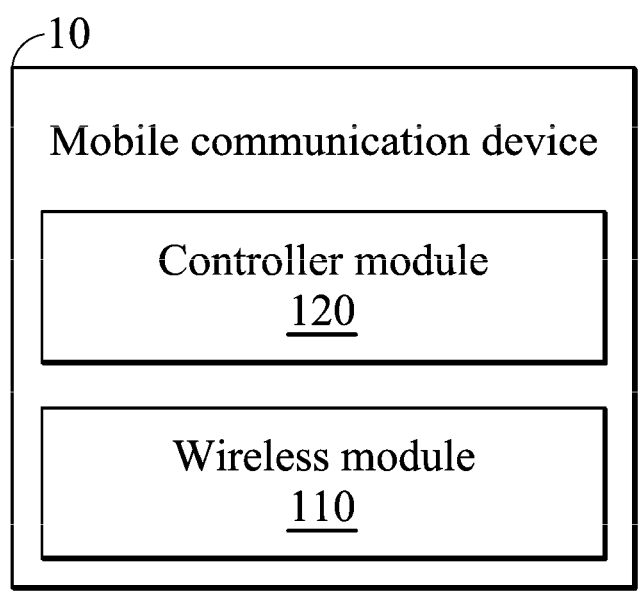
FIG. 2 is a block diagram illustrating the mobile communication device 10 according to an embodiment of the invention.

FIG. 2 is a block diagram illustrating the mobile communication device 10 according to an embodiment of the invention. The mobile communication device 10 comprises a wireless module 110 and a controller module 120, wherein the wireless module 110 is configured to perform the functionality of wireless transceiving and the controller module 120 is configured to control the operation of the wireless module 110 for performing the method for access configurations over the EACH in the present invention. To further clarify, the wireless module 110 may comprise a Radio Frequency (RF) unit, and the controller module 120 may comprise a general-purpose processor or Micro-Control Unit (MCU) of a baseband unit (or called a baseband processor). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 800 MHz, 1900 MHz, or 2400 MHz utilized in 1x CDMA2000 technology, or others depending on the wireless technology in use. Although not shown, the mobile communication device 10 may further comprise other functional components, such as a display unit and/or keypad serving as the Man-Machine Interface (MMI), a storage unit storing the program codes of applications and/or communication protocol(s), or others.

Similarly, the cellular access station 211 may comprise a wireless module (not shown) and a controller module (not shown), wherein the wireless module is configured to perform the functionality of wireless transceiving and the controller module is configured to control the operation of the wireless module for performing the method for access configurations over the EACH in the present invention. Regarding detailed description of the wireless module and the controller module in similarity, reference may be made to the embodiment of FIG. 2.

Figure 3:
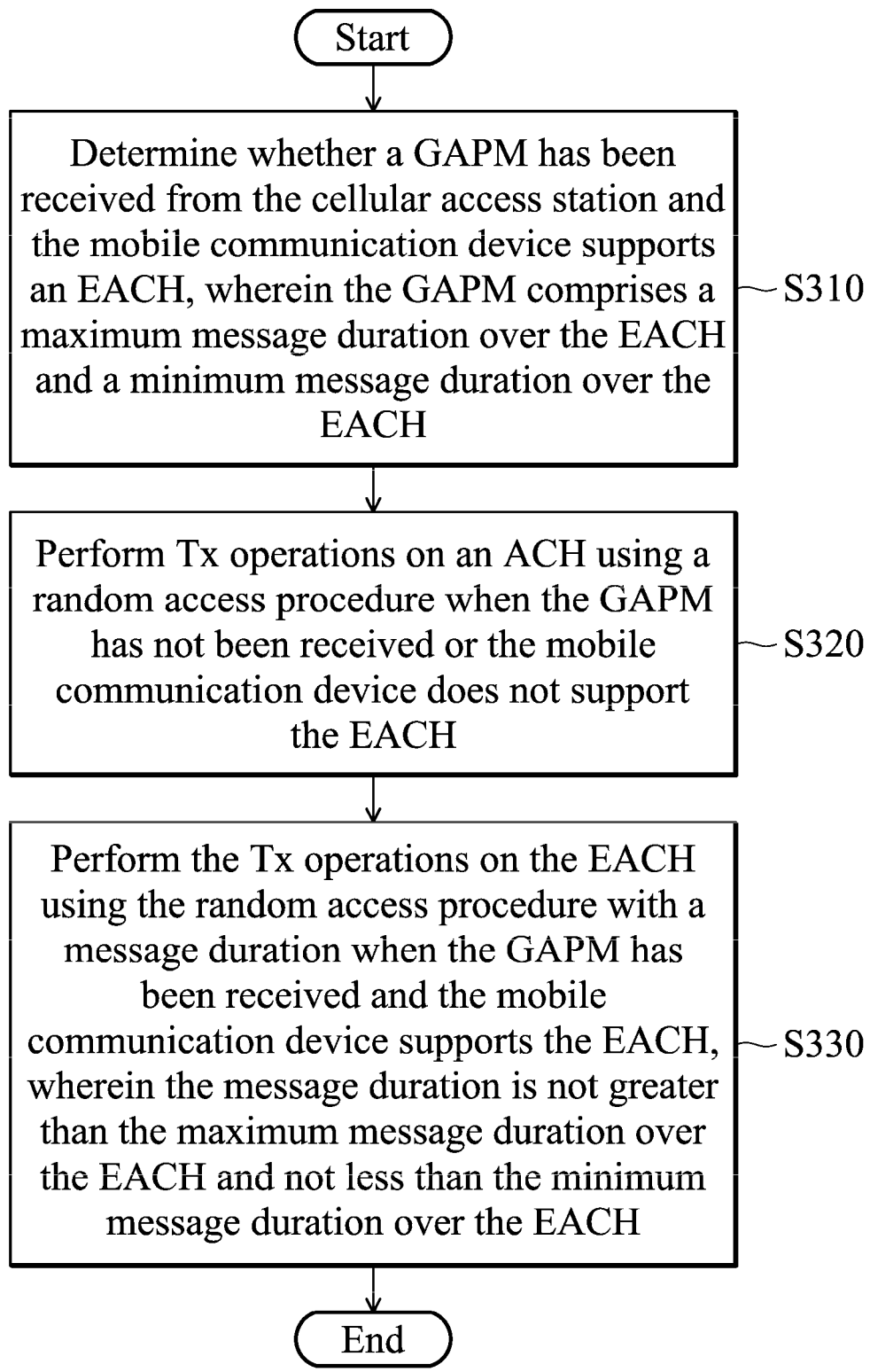
FIG. 3 is a flow chart illustrating the method for access configurations by a mobile communication device in communications with a cellular access station according to an embodiment of the invention.

FIG. 3 is a flow chart illustrating the method for access configurations by a mobile communication device in communications with a cellular access station according to an embodiment of the invention. To begin, the mobile communication device determines whether a GAPM has been received from the cellular access station and whether the mobile communication device supports an EACH, wherein the GAPM comprises a maximum message duration over the EACH and a minimum message duration over the EACH (step S310). Next, the mobile communication device performs Tx operations on an ACH using a random access procedure when the GAPM has not been received or the mobile communication device does not support the EACH (step S320), and the mobile communication device performs the Tx operations on the EACH using the random access procedure with a message duration when the GAPM has been received and the mobile communication device supports the EACH, wherein the message duration is not greater than the maximum message duration over the EACH and not less than the minimum message duration over the EACH (step S330). In one embodiment, both of the mobile communication device and the cellular access station operate in compliance with the communication protocol of the 1x EV-DO Rev F technology.

Figure 4:
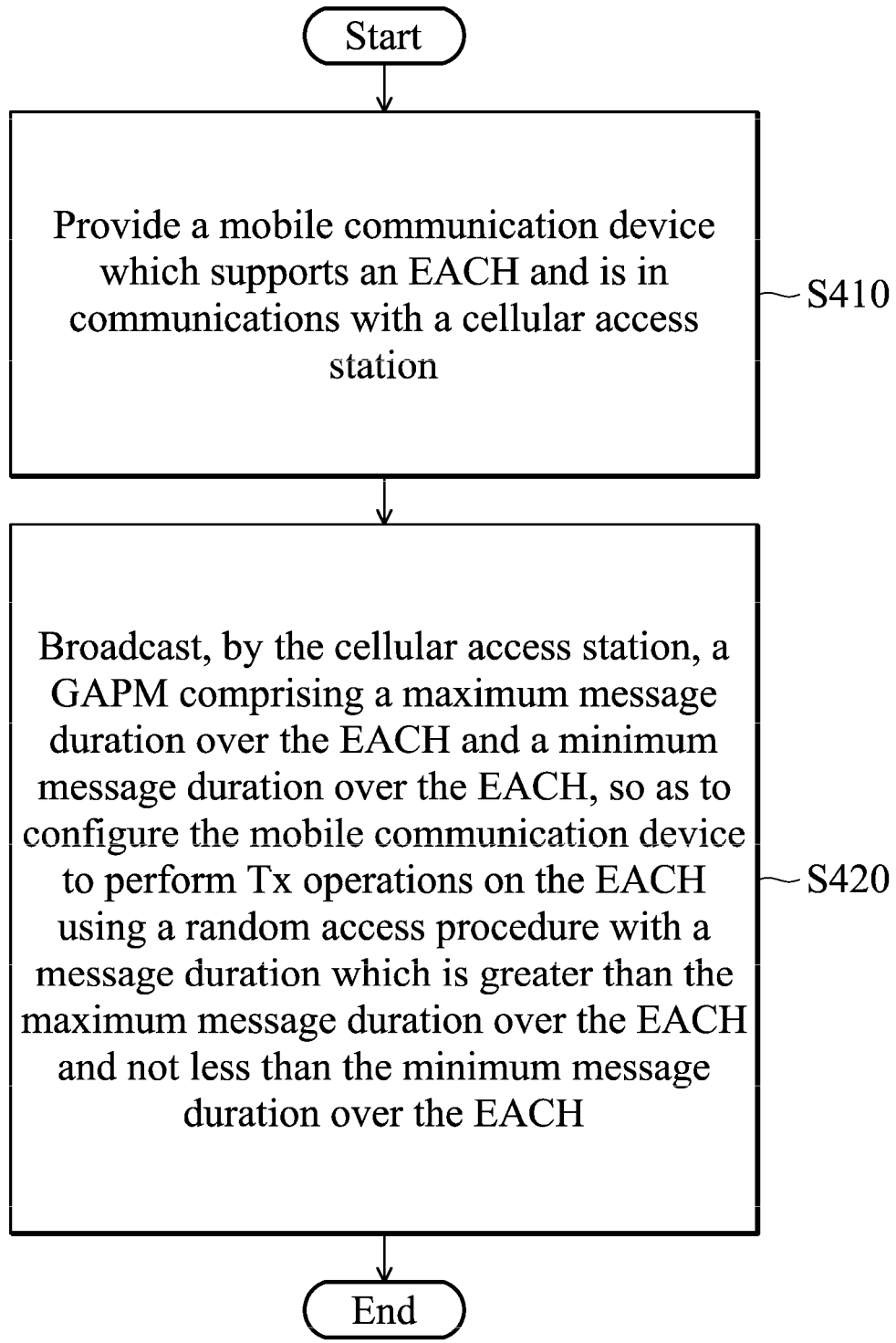
FIG. 4 is a flow chart illustrating the method for access configurations of a mobile communication device according to an embodiment of the invention.

FIG. 4 is a flow chart illustrating the method for access configurations between a mobile communication device and a cellular access station according to an embodiment of the invention. To begin, a mobile communication device is provided, which supports an EACH and is in communications with a cellular access station (step S410). Next, the cellular access station broadcasts a GAPM comprising a maximum message duration over the EACH and a minimum message duration over the EACH, so as to configure the mobile communication device to perform Tx operations on the EACH using a random access procedure with a message duration which is not greater than the maximum message duration over the EACH and not less than the minimum message duration over the EACH (step S420). In one embodiment, both of the mobile communication device and the cellular access station operate in compliance with the communication protocol of the 1x EV-DO Rev F technology.

Figure 5:
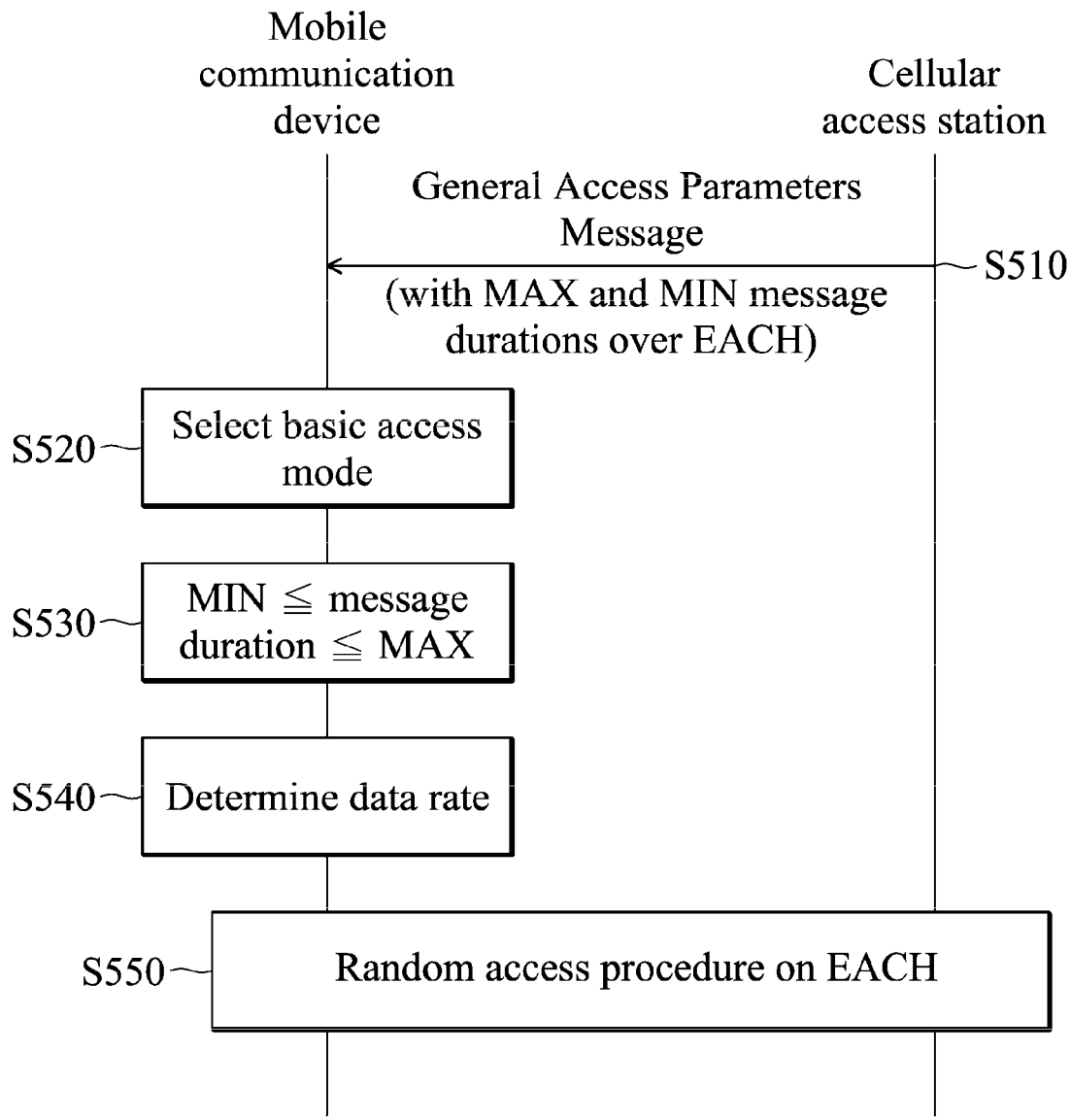
FIG. 5 is a message sequence chart illustrating access configurations of a mobile communication device according to an embodiment of the invention.

FIG. 5 is a message sequence chart illustrating access configurations between a mobile communication device and a cellular access station according to an embodiment of the invention. In this embodiment, the mobile communication device is configured as an M2M device supporting the EACH. At first, the cellular access station broadcasts a GAPM which comprises EACH related parameters, particularly including a maximum message duration over the EACH and a minimum message duration over the EACH (step S510). An exemplary data format of the GAPM is given below.

TABLE 1

| Field | Length (bits) |
|---|---|
| PILOT_PN | 9 |
| ACC_MSG_SEQ | 6 |
| USE_APM_PSIST_PARMS | 1 |
| PSIST_PARMS_INCL | 0 or 1 |
| PSIST(0-9)_EACH | 0 or 6 |
| PSIST(10)_EACH | 0 or 3 |
| PSIST(11)_EACH | 0 or 3 |
| PSIST(12)_EACH | 0 or 3 |
| PSIST(13)_EACH | 0 or 3 |
| PSIST(14)_EACH | 0 or 3 |
| PSIST(15)_EACH | 0 or 3 |
| MSG_PSIST_EACH | 0 or 3 |
| REG_PSIST_EACH | 0 or 3 |

TABLE 1-continued

| Field | Length (bits) |
|---|---|
| PSIST_EMG_INCL | 1 |
| PSIST_EMG | 0 or 3 |
| USE_APM_ACC_TMO | 1 |
| ACC_TMO | 0 or 6 |
| USE_APM_MAX_ACC_SEQ | 1 |
| MAX_REQ_SEQ | 0 or 4 |
| MAX_RSP_SEQ | 0 or 4 |
| ACCESS_MODE_MIN_DURATION | 2 |
| ACCESS_MODE_MAX_DURATION | 6 |
| RLGAIN_COMMON_PILOT | 6 |
| IC_THRESH | 4 |
| IC_MAX | 4 |
| EACH_NOM_PWR | 5 |
| EACH_INIT_PWR | 5 |
| EACH_PWR_STEP | 3 |
| EACH_NUM_STEP | 4 |
| EACH_PREAMBLE_ENABLED | 1 |
| EACH_PREAMBLE_NUM_FRAC | 0 or 4 |
| EACH_PREAMBLE_FRAC_DURATION | 0 or 4 |
| EACH_PREAMBLE_OFF_DURATION | 0 or 4 |
| EACH_PREAMBLE_ADD_DURATION | 0 or 4 |
| EACH_PROBE_BKOFF | 4 |
| EACH_BKOFF | 4 |
| EACH_SLOT | 6 |
| EACH_SLOT_OFFSET1 | 6 |
| EACH_SLOT_OFFSET2 | 6 |
| NUM_EACH_BA | 5 |
| EACH_BA_RATES_SUPPORTED | 8 |
| PILOT_REPORT | 1 |
| USE_ESPM_ACC_HO_PARAMS | 1 |
| CCH_INFO_INCL | 0 or 1 |
| ACC_ENT_HO_ORDER | 0 or 1 |
| ACCESS_HO | 0 or 1 |
| ACCESS_HO_MSG_RSP | 0 or 1 |
| ACCESS_PROBE_HO | 0 or 1 |
| ACC_HO_LIST_UPD | 0 or 1 |
| ACC_PROBE_HO_OTHER_MSG | 0 or 1 |
| MAX_NUM_PROBE_HO | 0 or 3 |
| NET_OVRLD_INDICATOR | 1 |
| NETWORK_ACCESS_PRIORITY | 0 or 3 |
| LOW_RATE_EACH_SUPPORT | 1 |
| SACK_SUPPORTED_INDICATOR | 1 |
| EACH_MAX_DURATION | 10 |
| EACH_MIN_DURATION | 10 |
| RESERVED | 0-7 (as needed) |

It is noted that, unlike conventional data format of the GAPM, the GAPM in the present application, as shown in Table 1, additionally comprises the "EACH_MAX_DURATION" field and the "EACH_MIN_DURATION" field for indicating the maximum and minimum message duration over the RACH, in units of 5 ms, 10 ms, or others. It is to be understood that, the naming of the "EACH_MAX_DURATION" and "EACH_MIN_DURATION" fields is merely an illustrative example, and the invention is not limited thereto. Descriptions of the other data fields in the GAPM are omitted herein as they are beyond the scope of the invention, and reference thereof may be made to the 3GPP2 C.S0005 Rev F specification.

Subsequently, upon receiving the GAPM, the mobile communication device selects the basic access mode for a random access procedure which is to be used for performing Tx operations on the EACH (step S520). Specifically, the mobile communication device may set a flag "GAPM_IN_USEs", which is used in the Layer 3 of the communication protocol in use between the mobile communication device and the cellular access station, to a first value (e.g., TRUE) for indicating that the GAPM has been received and that the mobile communication device supports the EACH. In response to the flag "GAPM_IN_USEs" being set to the first value, the mobile communication device may determine to use the basic access mode for the random access procedure. Otherwise, the mobile communication device may set the flag "GAPM_I-N_USEs" to a second value (e.g. FALSE) when no GAPM has been received or the mobile communication device does not support the EACH. For example, the flag "GAPM_I-N_USEs" may be a Boolean type of data.

Next, the mobile communication device determines a message duration for the Tx operations on the EACH, which is not greater than the maximum message duration over the EACH and not less than the minimum message duration over the EACH (step S530), and determines a lowest data rate for the Tx operations on the EACH, which fulfills the message duration, when the mobile communication device is configured as an M2M device (step S540). After that, the mobile communication device performs the random access procedure on the EACH (step S550). That is, the mobile communication device performs the Tx operations on the EACH using the random access procedure.

In one embodiment, the access mode selection, and the message duration and data rate determination may be performed in the MAC layer of the communication protocol in use between the mobile communication device and the cellular access station. Specifically, an enhanced access mode selection algorithm may be provided for this purpose to the Signaling Radio Burst Protocol (SRBP) entity in the MAC layer. An example of such an algorithm is written in pseudo-code as given below.

```
Access_Mode (size) //size represents the data size to be transmitted
{
    ACC_MODE_s = INVALID;
    ACC_RATE_s = INVALID;
    ACC_NUM_BITS_s = INVALID;
    ACC_FRAME_DURATION_s = INVALID;
    ACC_MAX_DURATION_s = INVALID;
    ACC_MIN_RATE_s = INVALID;
    ACC_MSG_SIZE_s = INVALID;
    EACH_NOM_PWR_s = INVALID;
    EACH_INIT_PWR_s = INVALID;
    EACH_PREAMBLE_ENABLED_s = INVALID;
    EACH_PREAMBLE_NUM_FRAC_s = INVALID;
    EACH_PREAMBLE_FRAC_DURATION_s = INVALID;
    EACH_PREAMBLE_OFF_DURATION_s = INVALID;
    NUM_STEP_s = INVALID;
    EACH_BKOFF_s = INVALID;
    EACH_PROBE_BKOFF_s = INVALID;
    EACH_SLOT_s = INVALID;
    Let each_rates be the set of R-EACH transmission rates (in bps) with the
        corresponding bit position in EACH_BA_RATES_SUPPORTED_s, as specified in
        Table 2-41, set to 1; //Table 2-41 may be referred to the 3GPP2 C.S0003 Rev F
        specification
Let rccch_rates be the set of R-CCCH transmission rates (in bps) with the
    corresponding bit position in RCCCH_RATES_SUPPORTED_s, as specified in Table
    2-41, set to 1; //Table 2-41 may be referred to the 3GPP2 C.S0003 Rev F
    specification
if (GAPM_IN_USEs==true)
{
    // d is the duration of the message at rate r in units of 5 ms
    Let r be the desired transmission rate on the R-EACH such that:
        r is a member of the set each_rates,
        d = ⌈1000 × size/r/5⌉, and
        (d >= EACH_MIN_DURATION) && (d <= EACH_MAX_DURATION);
    If the device is a delay tolerant device, r should be the lowest rate which fulfils the
        condition above. Otherwise, r should be the highest rate which fulfils the condition
        above.
    if (an acceptable value for r exists)
    {
        ACC_MODE_s= '000';
        ACC_RATE_s= r;
        ACC_NUM_BITS_s= the number of information bits that corresponds to r
            according to Table 2-43; //Table 2-41 may be referred to the 3GPP2 C.S0003
            Rev F specification
        ACC_FRAME_DURATION_s= the frame duration that corresponds to r according
            to Table2-43; //Table 2-41 may be referred to the 3GPP2 C.S0003 Rev F
            specification
        ACC_MAX_DURATION_s= EACH_MAX_DURATION;
        ACC_MIN_RATE_s= the minimum rate the mobile station supports
            that is greater than or equal to (size/ (EACH_MAX_DURATION× 5));
        ACC_MSG_SIZE= size;
        EACH_NOM_PWR_s= MODE_PARMS_s[ACC_MODE_s].EACH_NOM_PWR;
        EACH_INIT_PWR_s= MODE_PARMS_s[ACC_MODE_s].EACH_INIT_PWR;
        EACH_PREAMBLE_ENABLED_s=MODE_PARMS_s[ACC_MODE_s].
            EACH_PREAMBLE_ENABLED;
        EACH_PREAMBLE_NUM_FRAC_s=MODE_PARMS_s[ACC_MODE_s].
            EACH_PREAMBLE_NUM_FRAC;
        EACH_PREAMBLE_FRAC_DURATION_s=
            MODE_PARMS_s[ACC_MODE_s].EACH_PREAMBLE_FRAC_DURATION;
        EACH_PREAMBLE_OFF_DURATION_s=
            MODE_PARMS_s[ACC_MODE_s].EACH_PREAMBLE_OFF_DURATION;
        NUM_STEP_s=MODE_PARMS_s[ACC_MODE_s].EACH_NUM_STEP;
        EACH_BKOFF_s=MODE_PARMS_s[ACC_MODE_s].EACH_BKOFF;
        EACH_PROBE_BKOFF_s=
```

```
        MODE_PARMS_s[ACC_MODE_s].EACH_PROBE_BKOFF;
      EACH_SLOT_s=MODE_PARMS_s[ACC_MODE_s].EACH_SLOT;
      ACC_RESIDUAL_SIZE_s=ACC_RATE_s × ACC_FRAME_DURATION_s ×
        ⌊(ACC_MAX_DURATION_s × 5)/ACC_FRAME_DURATION_s⌋;
      return("Success");
    }
  }
  else
  {
    for (i=1; i <= NUM_MODE_SELECTION_ENTRIES_S; i++)
    {
      if (the mobile station supports access mode
          MODE_SELECTION_S[i].ACCESS_MODE)
      {
        if (MODE_SELECTION_S[i].ACCESS_MODE == '000')
        {
          //d is the duration of the message at rate r in units of 5 ms
          Let r be the desired transmission rate on the R-EACH such that:
            r is a member of the set each_rates,
            d = ⌈1000 × size/r/5⌉, and
            (d >= MODE_SELECTION_S[i].MIN_DURATION) &&
            (d <= MODE_SELECTION_S[i].MAX_DURATION);
        }
        else if (MODE_SELECTION_S[i].ACCESS_MODE == '001')
        {
          // d is the duration of the message at rate r in units of 5 ms
          Let r be the desired transmission rate on the R-CCCH such that:
            r is a member of the set rcccch_rates,
            d = ⌈1000 × size/r/5⌉, and
            (d >= MODE_SELECTION_S[i].MIN_DURATION) &&
            (d <= MODE_SELECTION_S[i].MAX_DURATION);
        }
        else return("Failure");
        if (an acceptable value for r exists)
        {
          ACC_MODE_s = MODE_SELECTION_S[i].ACCESS_MODE;
          ACC_RATE_s = r;
          ACC_NUM_BITS_s = the number of information bits that corresponds to r
            according to Table 2-43; //Table 2-41 may be referred to the 3GPP2
            C.S0003 Rev F specification
          ACC_FRAME_DURATION_s = the frame duration that corresponds to r
            according to Table 2-43; //Table 2-41 may be referred to the 3GPP2
            C.S0003 Rev F specification
          ACC_MAX_DURATION_s = MODE_SELECTION_S[i]. MAX_DURATION;
          ACC_MIN_RATE_s = the minimum rate the mobile station supports that is
            greater than or equal to (size/ (MODE_SELECTION_S[i].
            MAX_DURATION × 5));
          ACC_MSG_SIZE = size;
          EACH_NOM_PWR_s=
            MODE_PARMS_s[ACC_MODE_s].EACH_NOM_PWR;
          EACH_INIT_PWR_s= MODE_PARMS_s[ACC_MODE_s].EACH_INIT_PWR;
          EACH_PREAMBLE_ENABLED_s=MODE_PARMS_s[ACC_MODE_s].
             EACH_PREAMBLE_ENABLED;
          EACH_PREAMBLE_NUM_FRAC_s=MODE_PARMS_s[ACC_MODE_s].
             EACH_PREAMBLE_NUM_FRAC;
          EACH_PREAMBLE_FRAC_DURATION_s=
             MODE_PARMS_s[ACC_MODE_s].
             EACH_PREAMBLE_FRAC_DURATION;
          EACH_PREAMBLE_OFF_DURATION_s=
             MODE_PARMS_s[ACC_MODE_s].
             EACH_PREAMBLE_OFF_DURATION;
          NUM_STEP_s = MODE_PARMS_s[ACC_MODE_s].EACH_NUM_STEP;
          EACH_BKOFF_s = MODE_PARMS_s[ACC_MODE_s].EACH_BKOFF;
          EACH_PROBE_BKOFF_s=
             MODE_PARMS_s[ACC_MODE_s].EACH_PROBE_BKOFF;
          EACH_SLOT_s = MODE_PARMS_s[ACC_MODE_s].EACH_SLOT;
          ACC_RESIDUAL_SIZE_s = ACC_RATE_s × ACC_FRAME_DURATION_s ×
             ⌊(ACC_MAX_DURATION_s × 5)/ACC_FRAME_DURATION_s⌋;
          return("Success");
        }
      }
      return ("Failure");
    }
  }
}
```

It is noted that, the underlined parts of the pseudo-code depict the detailed description of steps S520 to S540 in FIG. 5. The detailed descriptions of the other parts of the pseudo-code are omitted herein since they are beyond the scope of the invention, and reference thereof may be made to the 3GPP2 C.S0003 Rev F specification.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communication device, coupled to a cellular access station, the mobile communication device comprising:
   a wireless module performing wireless transmissions and receptions to and from the cellular access station; and
   a controller module determining whether a Generic Access Parameters Message (GAPM) has been received from the cellular access station via the wireless module and whether the mobile communication device supports an Enhanced Access Channel (EACH), performing Transmission operations on an Access Channel (ACH) using a random access procedure via the wireless module when the GAPM has not been received or the mobile communication device does not support the EACH, and selecting a basic access mode for the random access procedure and performing the Transmission operations on the EACH using the random access procedure with a message duration via the wireless module, when the GAPM has been received and the mobile communication device supports the EACH,
   wherein the GAPM comprises a maximum message duration over the EACH and a minimum message duration over the EACH, and the message duration is not greater than the maximum message duration over the EACH and not less than the minimum message duration over the EACH.

2. The mobile communication device of claim 1, wherein the controller module further sets a flag to a first value for indicating that the GAPM has been received and that the mobile communication device supports the EACH, or sets the flag to a second value for indicating that the GAPM has not been received or that the mobile communication device does not support the EACH.

3. The mobile communication device of claim 2, wherein the flag is used in a Layer 3 of a communication protocol between the mobile communication device and the cellular access station.

4. The mobile communication device of claim 1, wherein the controller module further determines whether the mobile communication device is configured as a Machine-to-Machine (M2M) device, selects a first data rate for the Tx operations on the EACH when the mobile communication device is configured as the M2M device, and selects a second data rate for the Tx operations on the EACH when the mobile communication device is not configured as the M2M device, wherein the first data rate is the lowest date rate which fulfills the message duration, and the second data rate is the highest date rate which fulfills the message duration.

5. The mobile communication device of claim 1, wherein both of the mobile communication device and the cellular access station operate in compliance with a communication protocol of the CDMA2000 1x Revision F.

6. A method for access configurations by a mobile communication device in communications with a cellular access station, comprising:
   determining whether a Generic Access Parameters Message (GAPM) has been received from the cellular access station and whether the mobile communication device supports an Enhanced Access Channel (EACH), wherein the GAPM comprises a maximum message duration over the EACH and a minimum message duration over the EACH;
   when the GAPM has not been received or the mobile communication device does not support the EACH, performing Transmission (Tx) operations on an Access Channel (ACH) using a random access procedure; and
   when the GAPM has been received and the mobile communication device supports the EACH, selecting a basic access mode for the random access procedure and performing the Tx operations on the EACH using the random access procedure with a message duration, wherein the message duration is not greater than the maximum message duration over the EACH and not less than the minimum message duration over the EACH.

7. The method of claim 6, further comprising:
   setting a flag to a first value for indicating that the GAPM has been received and that the mobile communication device supports the EACH, or
   setting the flag to a second value for indicating that the GAPM has not been received or that the mobile communication device does not support the EACH.

8. The method of claim 7, wherein the flag is used in a Layer 3 of a communication protocol between the mobile communication device and the cellular access station.

9. The method of claim 6, further comprising:
   determining whether the mobile communication device is configured as a Machine-to-Machine (M2M) device; and
   when the mobile communication device is configured as the M2M device, selecting a first data rate for the Tx operations on the EACH, wherein the first data rate is the lowest date rate which fulfills the message duration; and
   when the mobile communication device is not configured as the M2M device, selecting a second data rate for the Tx operations on the EACH, wherein the second data rate is the second date rate which fulfills the message duration.

10. The method of claim 6, wherein both of the mobile communication device and the cellular access station operate in compliance with a communication protocol of the CDMA2000 1x Revision F.

11. A cellular access station, coupled to a mobile communication device, the cellular access station comprising:
    a wireless module performing wireless transmissions and receptions to and from the mobile communication device supporting an Enhanced Access Channel (EACH); and
    a controller module broadcasting, via the wireless module, a Generic Access Parameters Message (GAPM) comprising a maximum message duration over the EACH and a minimum message duration over the EACH, so as to configure the mobile communication device to select a basic access mode for a random access procedure and perform Transmission (Tx) operations on the EACH using the random access procedure with a message duration which is not greater than the maximum message duration over the EACH and not less than the minimum message duration over the EACH.

12. The cellular access station of claim 11, wherein both of the mobile communication device and the cellular access station operate in compliance with a communication protocol of the CDMA2000 1x Revision F.

13. A method for access configurations between a mobile communication device and a cellular access station, comprising:
   providing the mobile communication device which supports an Enhanced Access Channel (EACH) and is in communications with the cellular access station; and
   broadcasting, by the cellular access station, a Generic Access Parameters Message (GAPM) comprising a maximum message duration over the EACH and a minimum message duration over the EACH, so as to configure the mobile communication device to select a basic access mode for a random access procedure and perform Transmission (Tx) operations on the EACH using a random access procedure with a message duration which is not greater than the maximum message duration over the EACH and not less than the minimum message duration over the EACH.

14. The method of claim 13, wherein both of the mobile communication device and the cellular access station operate in compliance with a communication protocol of the CDMA2000 1x Revision F.

* * * * *